US009094632B2

(12) United States Patent
Xuan

(10) Patent No.: US 9,094,632 B2
(45) Date of Patent: Jul. 28, 2015

(54) DISPLAYING OBJECTS WITH CERTAIN VISUAL EFFECTS

(75) Inventor: Jiang Xuan, Mountain View, CA (US)

(73) Assignee: Measureout, LLC, Bellevue, WA (US)

( * ) Notice: Subject to any disclaimer, the term of this patent is extended or adjusted under 35 U.S.C. 154(b) by 660 days.

(21) Appl. No.: 12/630,713

(22) Filed: Dec. 3, 2009

(65) Prior Publication Data
US 2010/0134594 A1 Jun. 3, 2010

Related U.S. Application Data

(60) Provisional application No. 61/119,714, filed on Dec. 3, 2008.

(51) Int. Cl.
*H04N 13/02* (2006.01)
*H04N 1/393* (2006.01)
*G06T 3/40* (2006.01)

(52) U.S. Cl.
CPC . *H04N 1/393* (2013.01); *G06T 3/40* (2013.01)

(58) Field of Classification Search
CPC ....................................................... H04N 1/393
USPC .......................................................... 348/46
See application file for complete search history.

(56) References Cited

U.S. PATENT DOCUMENTS

| | | | |
|---|---|---|---|
| 6,005,607 A | 12/1999 | Uomori et al. | |
| 6,630,938 B1 * | 10/2003 | Nanni | 345/629 |
| 7,397,481 B2 | 7/2008 | Endo et al. | |
| 7,689,908 B2 | 3/2010 | Yan et al. | |
| 8,442,324 B2 | 5/2013 | Bates et al. | |
| 2002/0054048 A1 | 5/2002 | Nah et al. | |
| 2005/0104881 A1 * | 5/2005 | Yoshida et al. | 345/419 |
| 2009/0009511 A1 * | 1/2009 | Ueda et al. | 345/419 |

FOREIGN PATENT DOCUMENTS

| | | |
|---|---|---|
| CN | 1604026 A | 4/2005 |
| CN | 1815439 A | 8/2006 |
| CN | 101079151 A | 11/2007 |
| KR | 20030078572 A | 10/2003 |
| KR | 20040095028 A | 11/2004 |
| KR | 100620974 B1 | 9/2006 |

OTHER PUBLICATIONS

CN Search Report issued Jul. 12, 2013 in re CN Application No. 200980156075.6 filed Aug. 3, 2011.

(Continued)

*Primary Examiner* — Richard Torrente
(74) *Attorney, Agent, or Firm* — Coats and Bennett, PLLC

(57) ABSTRACT

Embodiments of the invention provide methods, systems, and articles for displaying objects in images, videos, or a series of images with WYSIWYG (what you see is what you get) effects, for calibrating and storing dimensional information of the display elements in a display system, and for constructing 3-dimensional features and size measurement information using one camera. Displaying merchandises with WYSIWYG effects allows online retailers to post vivid pictures of their sales items on the Internet to attract online customers. The processes of calibrating a display system and the processes of constructing 3-dimensional features and size measurement information using one camera are applications of the invention designed to achieve desired WYSIWYG effects.

14 Claims, 21 Drawing Sheets

(56) References Cited

OTHER PUBLICATIONS

International Search Report mailed Apr. 30, 2010 in re International Application No. PCT/IB2009/008041 filed Dec. 3, 2009.
Kyrnin, J., "TrueSize.com", About.com Guide, Sep. 17, 2003, pp. 1-4, [retrieved on Oct. 3, 2013], retrieved from internet: http://webdesign.about.com/b/2003/09/17/truesizecom.htm.
Kyrnin, J., "Truesize.com—Show Your Products at their REAL Size", About.com Guide, [retrieved on Oct. 3, 2013], review updated: Nov. 26, 2012, p. 1, retrieved from internet: http://webdesign.about.com/cs/software/gr/aapr_truesize.htm.
3D Rev, "Samples of 360 Product View Images", 3drev.com, Catalog, pp. 1-2 [retrieved on Oct. 3, 2013], retrieved from internet: http://www.3drev.com/catalog.html.
3Dsom.com, "Welcome to 3D Software Object Modeller Pro", [retrieved on Oct. 3, 2013], pp. 1-2, retrieved from internet: http://www.3dsom.com/.
Nations, D., "Virtual Shopping with Kinset, The Virtual Shopping Mall", About.com web trends, [retrieved on Oct. 3, 2013], p. 1, retrieved from internet:http://webtrends.about.com/od/webapplications/a/virtualshopping.htm.
Smallman, M., "Table of Watch Sizes", Updated Apr. 4, 1999, [retrieved on Oct. 3, 2013], pp. 1-2, retrieved from internet: http://www.horology.com/h--wasize.html.
ewatches.com, "Mid-day Markdown", online catalog, [retrieved on Oct. 3, 2013], p. 1, retrieved from internet: http://www.ewatches.com/Information/Watch-Case-Sizing-Guide.html.
displaywars.com, "Screen Size Comparison", [retrieved on Oct. 3, 2013], p. 1, retrieved from internet: http://www.displaywars.com/.
Annonymous, "Tsai Camera Calibration", [retrieved on Oct. 3, 2013], pp. 1-5, retrieved from internet: http://homepages.inf.ed.ac.uk/rbf/CVonline/LOCAL_COPIES/DIAS1/.
Bouguet, J-Y., "Camera Calibration Toolbox for Matlab", Last updated Jul. 9, 2010, [retrieved on Oct. 3, 2013], pp. 1-4, retrieved from internet: http://www.vision.caltech.edu/bouguetj/calib_doc/.
Wikipedia, "OpenCV", online article, last modified Aug. 23, 2013, [retrieved on Oct. 3, 2013], pp. 1-4, retrieved from internet:http://en.wikipedia.org/wiki/OpenCV.
Wikipedia, "3D Projection", online article, last modified Sep. 11, 2013, [retrieved on Oct. 3, 2013], pp. 1-3, retrieved from internet: http://en.wikipedia.org/wiki/3D_projection.
Wikipedia, "Pixel aspect ratio", online article, last modified May 31, 2013, [retrieved on Oct. 3, 2013], pp. 1-8, retrieved from internet: http://en.wikipedia.org/wiki/Pixel_aspect_ratio.

* cited by examiner

Calibrating the camera using a reference object

DISPLAYING OBJECTS WITH CERTAIN VISUAL EFFECTS

PRIORITY CLAIM

This application claims priority of the U.S. provisional application titled "Method to Measure and Demonstrate Real Size of Objects on Computer Displays and Cell Phone Screens," filed on Dec. 3, 2008, and with application No. 61,119,714.

BACKGROUND

Many retailers advertise their merchandise by posting photos and videos on Internet websites. Customers can browse through the sales items on display at those websites from their computers and can purchase whatever they desire over the Internet with a click of a button. More convenient than in store shopping, however, buying over the Internet does have drawbacks. Because a customer can not physically check out a sales item, she is unlikely to appreciate the unique product design or to get a feel of the dimensions of a sales item by looking at photos and videos. A cautious customer may require more persuasion than what photos and videos can provide. A frustrated customer may return a piece of merchandise purchased over the internet when he realizes it is not of a desired size or it looks quite different in real life than what is shown on the website. Different methods have been used to allow Internet users to get a sense of the true size or other features of the sales item. FIG. 1a shows an example of such methods.

In FIG. 1a, a photo 102 shows an image of a human hand 104 holding a digital camera 108. By demonstrating that the digital camera 108 can fit into the palm of the human hand 104, the photo 102 conveys to a viewer how small the digital camera 108 is. Other comparisons, such as using a standing human being, are frequently used as well to convey a rough sense of the real object. Viewers can perceive how large or small the item truly is but will not be able to gauge it precisely because the sizes of human hands or the heights of human beings vary widely. Sometimes a standard reference object, such as a ruler, is photographed together with an object. While a viewer can read the precise measurements of that object by referencing the ruler, such method differs little from labeling the object numerically with its geometric dimensions.

In-store shopping has the advantage of allowing customers to touch and feel the sales items that are on display. But it also has drawbacks of its own. It is difficult for a customer to find out how a product displayed in a store will fit at home after it has been purchased. For example, before a customer buys a piece of furniture for her home, she may want to make sure that the piece of furniture fits into her home environment. FIG. 1b illustrates the problem she might face. In FIG. 1b, a home environment 152 includes a sofa 154 and a chair 160. The customer wants to purchase a coffee table 158 that will not only fit into the space between the sofa 154 and the chair 160 but also match the existing décor. Normally, the customer can measure and write down the dimensions of the corner space before going to the store. Once she gets there she can compare the measurements of the coffee table 158 with what she has written down. For the rest, she can only rely on her memory to make sure that the color and the style of the coffee table 158 match those of the sofa 154 and chair 160.

Innovative methods are needed to allow a customer to enjoy in-store browsing experience while sitting in front of a computer or to bring her home environment with her while shopping in store.

SUMMARY

In general, methods of displaying an object in an image, a video or a series of images with desired what you see is what you get (WYSIWYG) effects are disclosed. One of the WYSIWYG effects is making the size of the object in the image or the video equals or approximately equals to its real size. With a display system that includes one or more display elements or display units, such method may include the following steps. First, for each geometric dimension, the size of a display element of the display system is derived and the number of display elements that the object in the desired size spans is calculated. Second, for each geometric dimension, based on the number of display elements, the 2-dimensional object in the desired size is presented by uniformly resizing the image, the video or the series of images. The method can be used to display a 2-dimensional object or the 2-dimensional features of a 3-dimensional object. The method can also be used to display multiple objects together with one of the multiple objects fitted in a desired size. These methods may be particularly useful to online retailers because online retailers want to display a piece of sales item in a particular size, for example, its real size, in order to allow an online shopper to appreciate a certain feature of that item, for example, the compact design. For example, the sales item may be a digital camera and displaying the digital camera in its real size allows an online shopper to appreciate how compact the camera design is.

In one implementation of these methods, the size of each display element of a display system along one particular geometric dimension is derived from dividing the length of the display system by a resolution in that geometric dimension.

The size of a display element may be also determined through a user calibration process. One type of user calibration process includes the following steps. First, a user is asked to input the diagonal size of the display system. Then the user input is verified by presenting a well known 2-dimensional object in its real size based on the user input of the diagonal size of the system. If the user input is incorrect, the presentation of the well-known object will not match the real object.

Another type of user calibration process involves a user creating a profile of a well known object on the display system by placing a calibration point on the display system for each of the geometrical points of the well known object. Then a computer application implemented for this type of user calibration process measures the size of the profile and determines the number of display elements filled by the profile for each geometric dimension. The application calculates the size of a display element by dividing the size of the profile by the number of display elements for that geometric dimension.

Yet another type of user calibration process involves a user placing a well known object on the display system adjacent to a frame of the display system for support and alignment, and marking a first geometric point of the well know object. A computer application implemented for this type of user calibration process generates a reference line on the display system that connects the first geometric point of the well known object and a second geometric point that is diagonally opposite to the first geometric point of the well known object. The application then creates a profile of the well known object on the display system based on the first geometric point, the reference line, and the geometric shape of the frame of the display system. For each geometric dimension the application measures the size of the profile, determines the number of display elements filled by the profile, and calculates the size of a display element by dividing the size of the profile by the number of display elements for that geometric dimension.

In some implementations, the well known object used in the above user calibration processes may be a driver's license card. When generating a profile of a driver's license card on the display system, a user may align the left side of the driver's license card with an edge of the display system and use the display frame to support the driver's license card. The user then places the cursor on one geometric point that is on either the top side or the right side of the driver's license card by using a mouse or keyboard. The well known object may also be a credit card or a compact disc.

In some implementations, each display element in a display system is a square and of the same size. In other implementations, each of the display element is a rectangle and of the same size.

In some implementations, for each geometric dimension, the resolution of the display system may be stored electronically at a pre-specified location. The length of the display system may be derived from the length of a diagonal line of the display system and the length-to-width ratio of the display system. The length of the display system may also be provided by a user.

In general, to calculate the number of display elements that the object in the desired size spans for each geometric dimension, the desired size of the object is divided by the size of the display element for that geometric dimension. The desired size of the object may be known before hand or be derived from a picture of the real object taken by a camera with known configuration. The known configuration of the camera may include the distance between the object and the lens system of the camera, the focal distance of the lens system of the camera, and distortions caused by the camera. To increase accuracy, distortions may be corrected during the calculation.

Also disclosed in this specification is a method of displaying on a display system an object in a desired size relative to a background image. The method may include the following steps. For each geometric dimension, first figure out the real size of the object. Second derive the desired size of the object relative to the background based on the dimensional information of the background and the true size of the object. And finally calculate the number of display elements that an image of the object spans when the image is in the desired size relative to the background and display the image of the object based on the above calculation. One application of such method may be found in the process of buying a piece of furniture. The background is the home environment in which the piece of furniture will be placed.

This specification also discusses a method on constructing 3-dimensional features and size measurement information for a target object using one camera. The method includes the following steps: (a) selecting a reference object; (b) taking two or more pictures; each picture contains an image of the reference object and an image of the target object; (c) in each picture calibrating the camera using the image of the reference object to determine the rotation matrix and the translation matrix of the camera; (d) constructing the 3-dimensional features and size measurement information for the image of the target object based on the rotation and translation matrices of the camera and locations of each 3-dimensional feature in some or all pictures; and (e) displaying the image of the object with its 3-dimensional features using the constructed 3-dimensional features and measurement information.

A method of displaying an image of an object with 3-dimensional effects is also disclosed. Such method includes the following steps. First determine an appropriate size of a 2-dimensional feature of the object to be displayed on the display system and calculate the number of display elements that the 2-dimensional feature of the object spans when it is in the appropriate size. Second for each of the 3-dimensional effects in the image derive a resize ratio by dividing the distance between a viewer and the viewing panel of the display system by the distance between the 3-dimensional feature and the viewer. Finally, based on the resize ratio, display the 3-dimensional feature.

A second method of displaying an image of an object with 3-dimensional effects on a display system includes a different set of steps. First calculate the appropriate size of a front side of the object to be displayed on the display system as if the front side of the object were placed at a location that is of a distance equal to the distance between a viewer and the viewing panel of the display system. Second derive a resizing ratio for the front side by dividing the appropriate size of the front side of the object by the real size of the front side of the object. Third display the image of the object with 3-dimensional effects by adjusting the entire image of the object according to the resizing ratio.

The system that can be used to implement or run the above disclosed methods may include a display system comprising one or more display elements and a processing unit that can carry out those method steps. A computer-readable medium may be used to store the instructions for carrying out the above disclosed methods.

DETAILED DESCRIPTION

For an online user who sits in front of her computer browsing sales items on display at a retailer's website, several techniques can be employed to improve her shopping experience. One of the techniques is through the so-called WYSIWYG (what you see is what you get) approach. WYSIWYG effects can enhance real-life effects in graphic display and can makes it possible for an online user to appreciate certain real life features of an object that is on display, for example, the true size of the object.

Figure 1A:
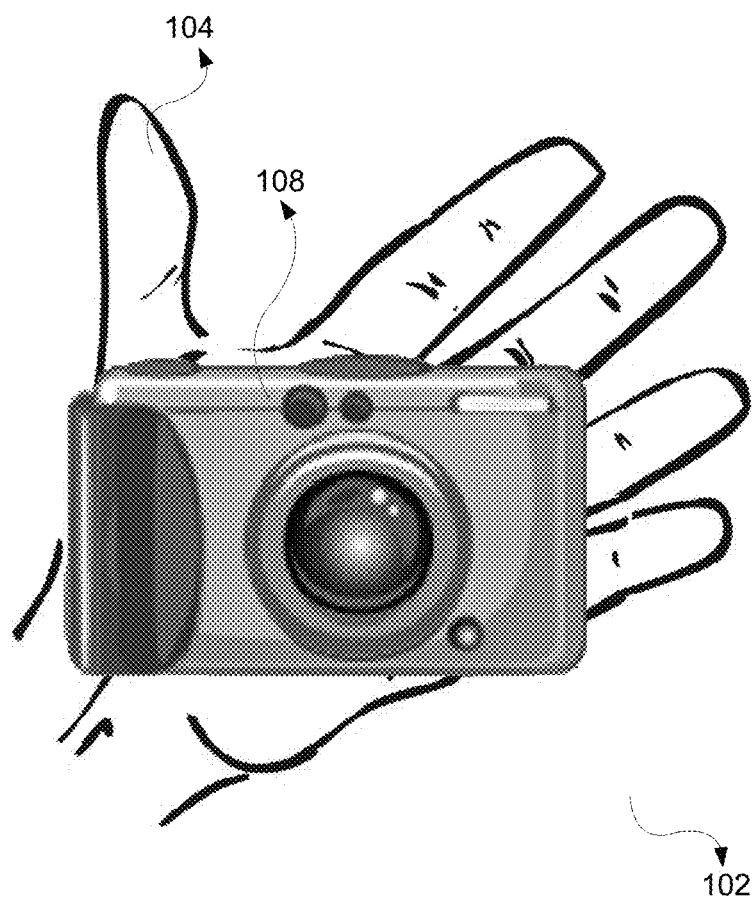
FIG. 1*a* is an advertisement showing a digital camera placed in the palm of a human hand.
Figure 1B:
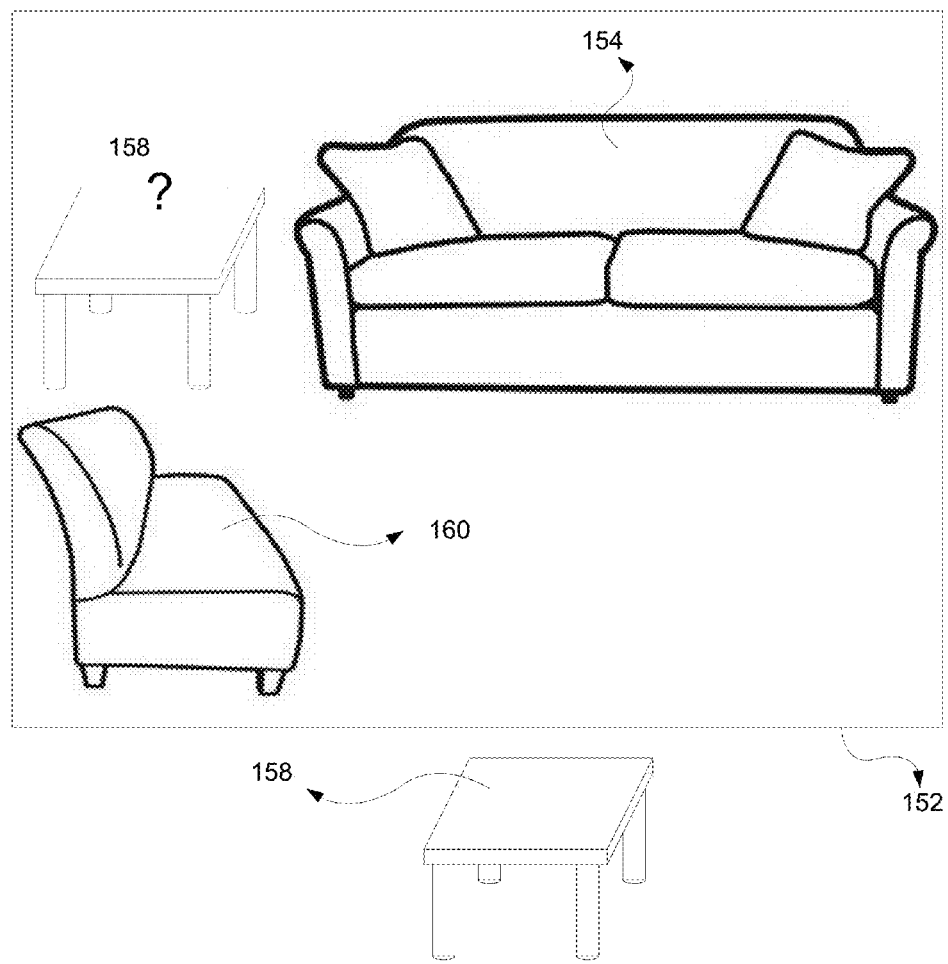
FIG. 1*b* illustrates a problem faced by a customer when buying a piece of furniture.
Figure 1C:
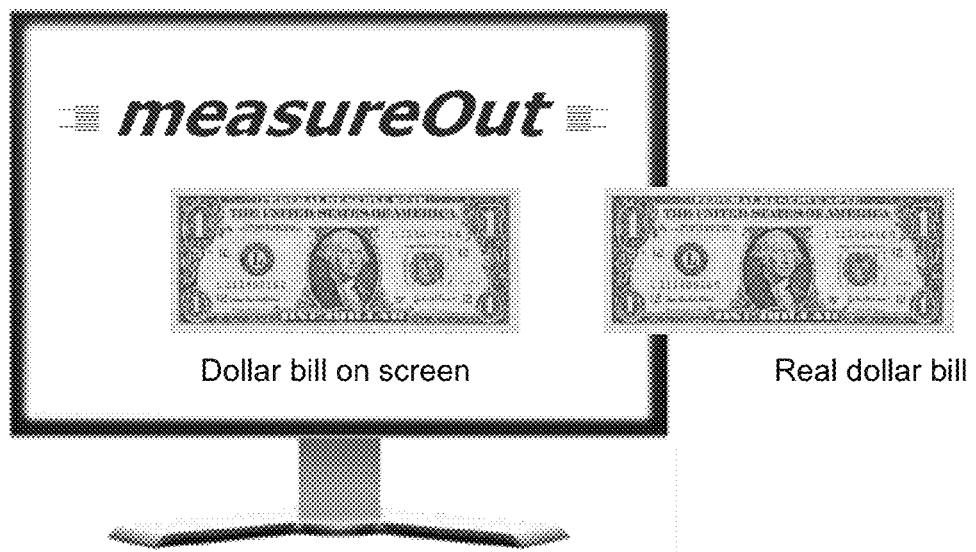
FIG. 1*c* illustrates a 2-dimensional object with WYSIWYG effects on a computer display.

To allow an online shopper to experience certain WYSIWYG effects of a 2-dimensional object, the object image can be enlarged or reduced to show the object in its real size or in a given ratio to its real size, such as 50% of the real size. The effect of a 2-dimensional object shown in its real size on the display is the same as if the 2-dimensional object were placed on the display, as shown in FIG. 1c. If the display is not big enough to show the entire object in real size or in a size of a given ratio to its real size, only a part of the object may be shown in order to fit into the screen. An online browser can select which part to be shown on the display.

Figure 1D:
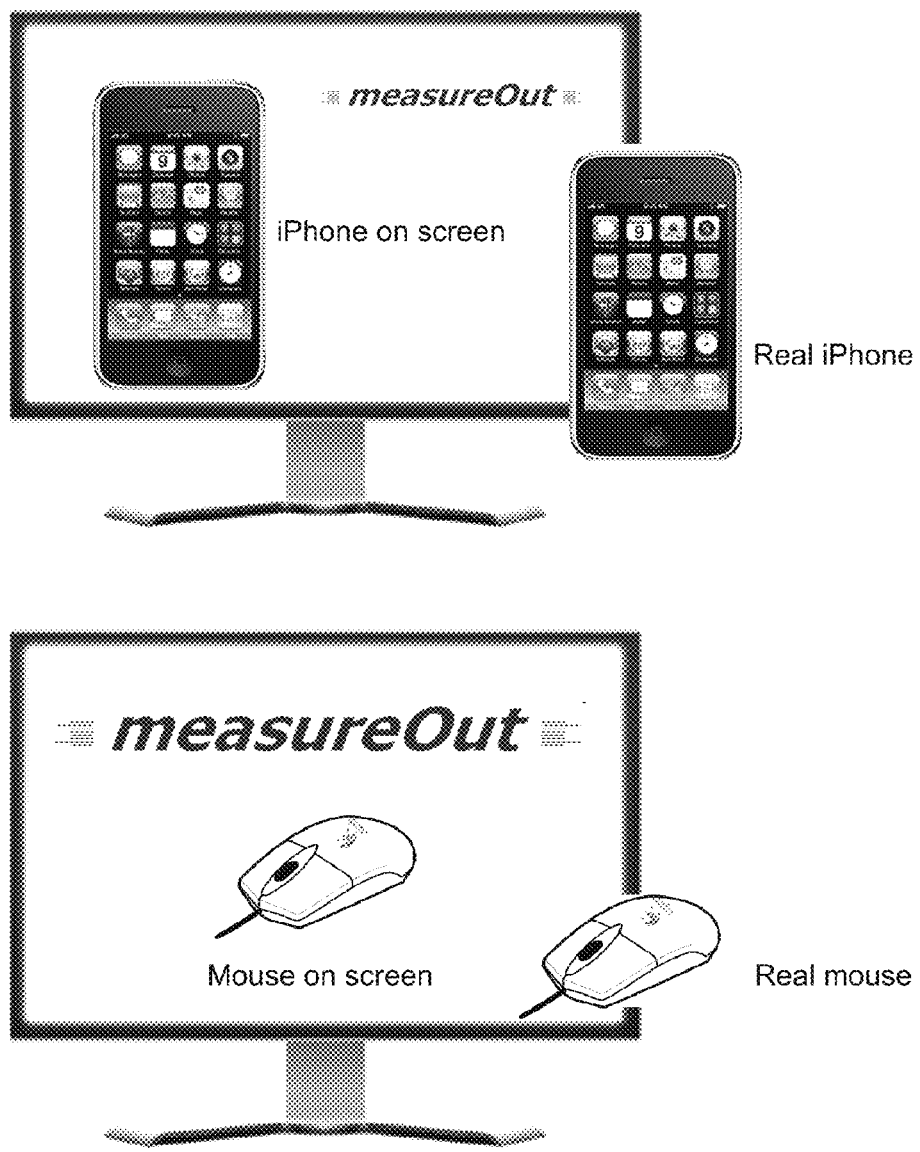
FIG. 1*d* illustrates a 3-dimensional object with WYSIWYG effects on a computer display.

To allow an online shopper to experience WYSIWYG effects of a 3-dimensional object, the object image can be enlarged or reduced to show a chosen 2-dimensional feature of the 3-dimensional object in real size or in a size of a given ratio to its real size. The effect of a 2-dimensional feature of a 3-dimensional object shown in its real size on the display is the same as if the 2-dimensional feature of the 3-dimensional object were placed on the display. As shown in FIG. 1d, a chosen 2-dimensional feature of the iPhone, the touch screen of the iPhone, is shown in real size on the display. The image of an iPhone is adjusted so that a chosen 2-dimensional feature (the touch screen of the iPhone) in the image is of the same size of the touch screen of a real iPhone. A chosen 2-dimensional feature of the Logitech VX Revolution mouse, the Logitech logo, is shown in real size on the display. The image of a Logitech VX revolution mouse is adjusted so that a chosen 2-dimensional feature (Logitech logo) is shown in its real size on the display. It looks as if a real Logitech VX revolution mouse is placed on the screen. When the object image is enlarged or reduced to show a specific 2-dimensional feature in real size or in a size of a given ratio to its real size, other 2-dimensional features of the object in the same image do not need to be of its real size or of a size with the same ratio to its real size.

Figure 1E:
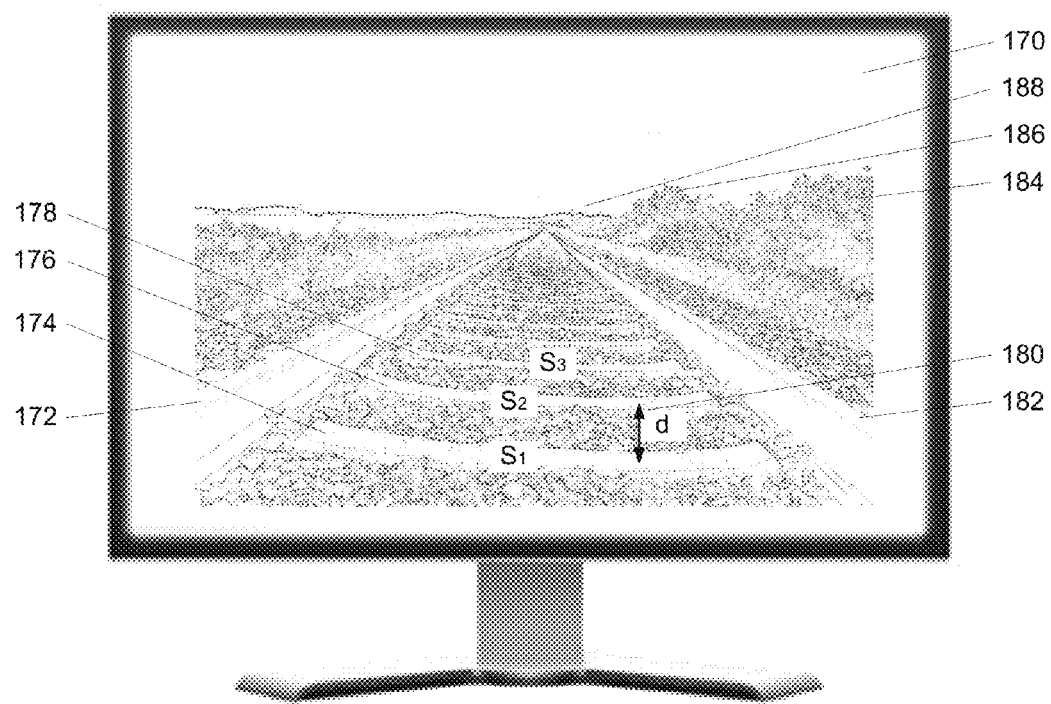
FIG. 1*e* illustrates a disappearing railway with WYSIWYG effects on a computer display.

To allow an online shopper to experience WYSIWYG effects of a 3-dimensional object in an image with several other objects, the image will be enlarged or reduced to show a chosen 2-dimensional feature of the chosen 3-dimensional object in real size or in a size of a given ratio to its real size. The effect of the chosen 2-dimensional feature of the chosen 3-dimensional object shown in its real size on the display is the same as if the chosen 2-dimensional feature of the chosen 3-dimensional object were placed on the display. As shown in FIG. 1e, there are many railroad sleepers in the image. A chosen 2-dimensional feature (the flat section of the top edge) of the 3-dimensional object (the closest railroad sleeper) is shown in 10.46% of real size on a 12.1 inch display with an aspect ratio of 4:3. The user can see the flat section of the top edge of the closest railroad sleeper in 10.46% of its real size on a 12.1 display with an aspect ratio of 4:3. When the image is enlarged or reduced to show a specific 2-dimensional feature in real size or in a size of a given ratio to its real size, other features of the same object in the same image and other objects in the same image do not need to be of real size or the same given ratio to real size. As shown in FIG. 1e, other sleepers are not in 10.46% of its real size.

Figure 1F:
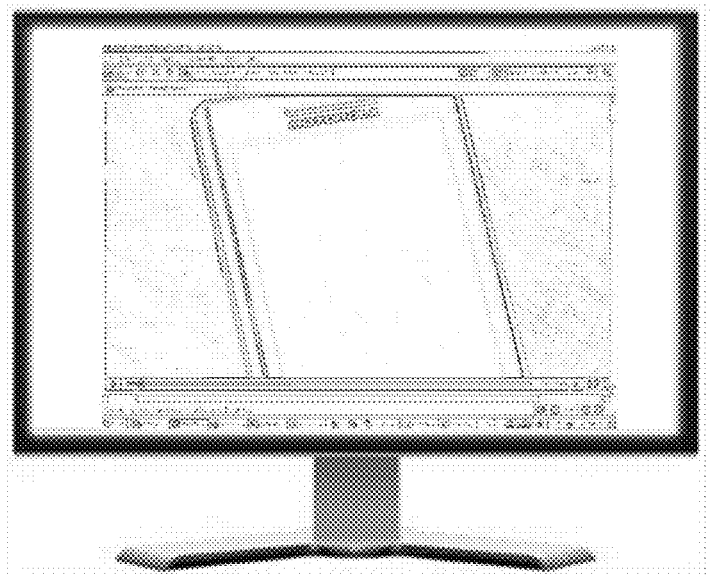
FIG. 1*f* illustrates a 3-dimensional object in a video frame with WYSIWYG effects on a computer display.

To allow an online user to experience WYSIWYG effects of a 3-dimensional object in a video frame or an image in a series of images, all frames or all images in the series will be enlarged or reduced in the same way to show the chosen 2-dimensional feature of the chosen 3-dimensional object in the chosen frame or the chosen image in its real size or in a size of a given ratio to its real size. As shown in FIG. 1f, a chosen 2-dimensional feature (the logo of MOTOROLA) of a chosen 3-dimensional object (a Droid phone) in the chosen frame (the frame at the beginning of the $11^{th}$ second of a YouTube video is shown in 195% of real size on a 12.1 display with an aspect ratio of 4:3.

Figure 1G:
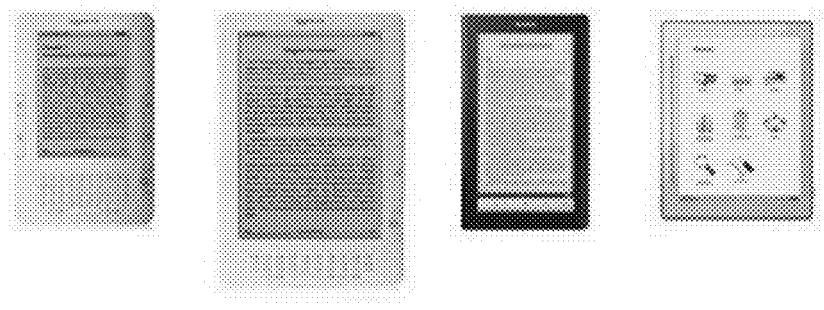
FIG. 1*g* illustrates multiple images of different objects placed together with WYSIWYG effects on a computer display.

To allow an online user to experience WYSIWYG effects of multiple objects, for example, to get a sense of the objects when they are in comparison with each other, the images and videos of all the objects may be enlarged or reduced. A specific 2-dimensional feature of a specific object will be chosen in each image or video. All images or video containing the chosen 2-dimensional feature will be displayed either with the 2-dimensional feature in real size, or in a size of the same ratio to their real size. As shown in FIG. 1g, there are four images of e-book readers. A specific 2-dimensional feature (the display of each e-book reader) of a specific 3-dimensional object (e-book reader) in each image is chosen. All chosen 2-dimensional features are shown in 25% of real size on a 12.1 inch display with an aspect ratio of 4:3.

The above described WYSIWYG effects enhance a viewer's visual experiences. The descriptions below illustrate how a computer application can be implemented to achieve those WYSIWYG effects on a display system. As a first step, the application needs to figure out the configuration of the viewer's display system. In the following discussion, user refers to those who set up and utilize the computer applications implemented based on this present invention in their businesses. An example of a user is an online retailer. A viewer/browser or customer refers to the customers of a user of the applications.

Figure 2A:
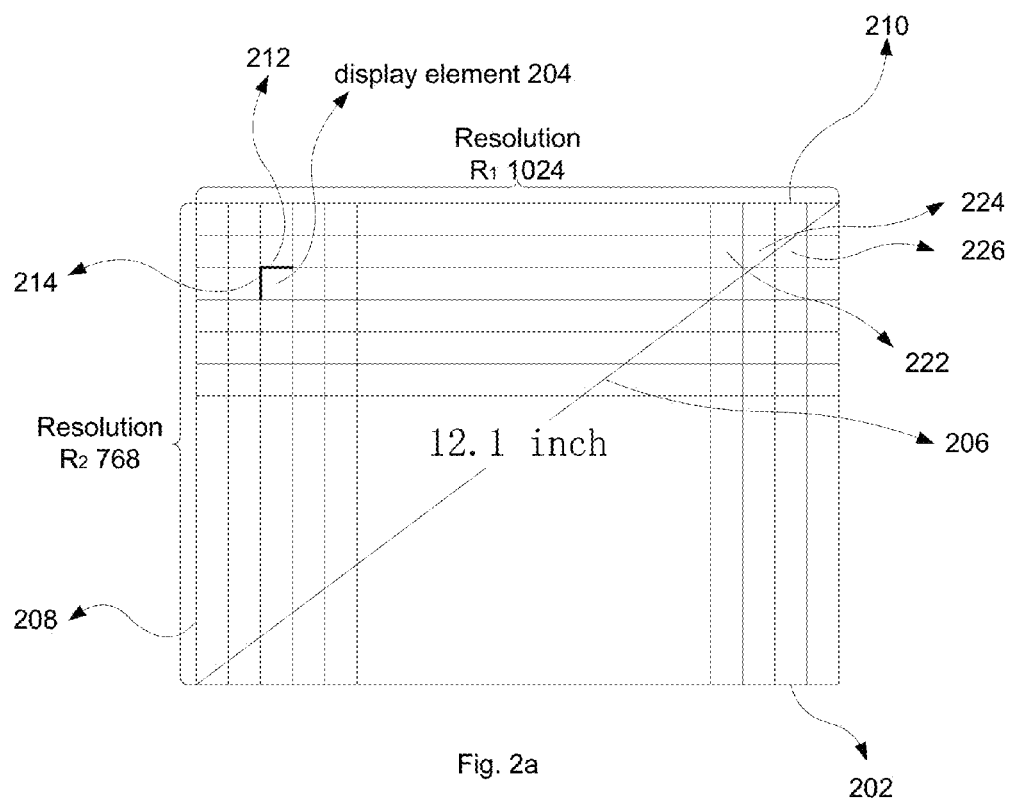
FIG. 2*a* is a display system that comprises a number of display elements.

As shown in FIG. 2a, an exemplary display system 202 often comprises multiple display elements 222, 224, 226, etc. The display system 202 may be a computer screen, a cell phone screen, a PDA screen, an iPhone screen, a monitor screen, a TV screen etc. The display elements in most of the display systems that are on the market today are of a uniform size. In the present application, the discussions are based on the assumption that the display elements in a display system are of the same size. However the same techniques and methods can be used on a display system comprised of display elements of different sizes.

In referring to FIG. 2a, the display system 202 is of a rectangular shape. Its diagonal line 206 (L) is 12.1 inches long. The display system 202 is composed of a grid of display elements and the resolution of the display system ($R_1 \times R_2$) is set to be 768×1024. Therefore, 768 display elements are arranged along the vertical dimension and 1024 display elements are arranged along the horizontal dimension. The total number of display elements is 768×1024=786,432.

The display element 204 may be of a shape of rectangle or square.

For a display system the aspect ratio is defined as the ratio of the length of the display system along the horizontal dimension to the length of the display system along the vertical dimension. The aspect ratio of the display system 202 is $D_1:D_2$.

For a display system with square display elements, $D_1:D_2=R_1:R_2$.

For a display system with rectangular display elements or square display elements, and with the above described configuration (diagonal line of 12.1 inches and resolution of 768×1024), we can calculate the side 212 ($l_1$) and the side 214 ($l_2$) using the following equations:

$$l_1 = \frac{L \cdot D_1}{R_1\sqrt{D_1^2 + D_2^2}}, l_2 = \frac{L \cdot D_2}{R_2\sqrt{D_1^2 + D_2^2}}. \quad (1)$$

The length of side 212 ($l_1$) and side 214 ($l_2$) can be calculated using the width and the height of the display system. In this specification, the discussion focuses on using the diagonal size and the aspect ratio of the display system. However the same techniques and methods are applicable in cases when the width and the length of the display system are known.

The resolution of the display system ($R_1 \times R_2$) can be retrieved from any application or system, for example, the online browser.

In calculating the size of each display element using Equation (1), one approach may be to retrieve the diagonal size and aspect ratio of the display system from the online browser software or hardware. In one implementation, the online browser software or hardware may obtain the information from the operating system and the operating system may be provided with the information by the display system hardware.

Another approach may be to ask a viewer to input the aspect ratio ($D_1:D_2$) and diagonal size (L) of the display system. In one implementation, the user is presented with a block or a circle on the display and is asked to visually identify whether the block is a square or a rectangle or whether the circle is an ellipse, as shown in element 1001 of FIG. 2b. The block or circle occupies the same number of display elements along the horizontal and vertical dimensions. The display elements in most display systems are square. If the user identifies that the block is a square or that the circle is not an ellipse, the aspect ratio of the display system can be expressed as $D_1:D_2=R_1:R_2$.

Figure 2B:
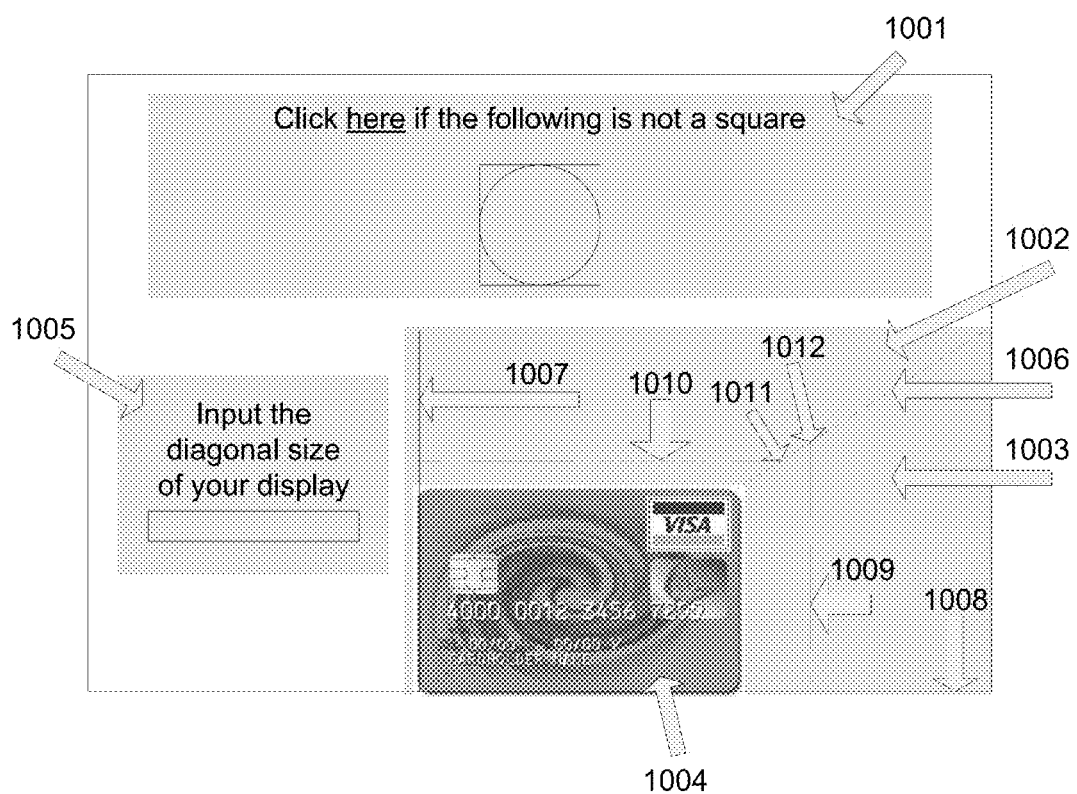
FIG. 2*b* illustrates calibrating a display system based on user input.
Figure 2C:
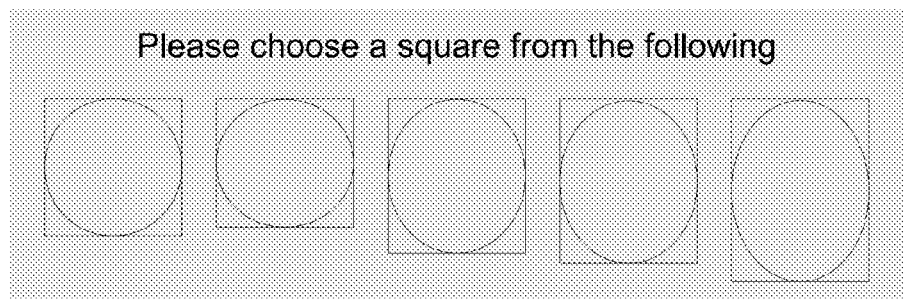
FIG. 2*c* illustrates deriving the aspect ratio of a display system based on user input.
Figure 2D:
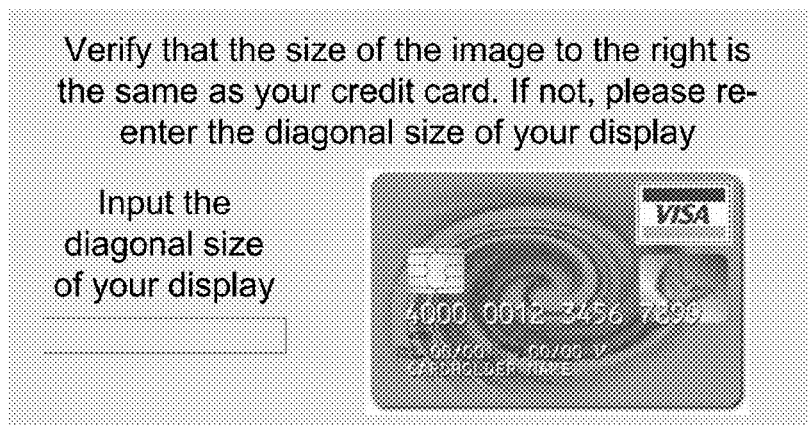
FIG. 2*d* illustrates deriving the dimensional information of a display system based on user input.

If the user identifies that the block as a rectangle instead of a square, or that the circle as an ellipse, he is then presented with several blocks or circles on the display as shown in FIG. 2c. The user is asked to identify which block or circle is a square or a perfect circle (i.e., not an ellipse). Each block or circle corresponds to a specific aspect ratio, $D_1:D_2$, for example, 4:3, 3:2, 5:4, 16:10, 16:9, etc. The ratio of the number of display elements on the vertical dimension to the number of display elements on the horizontal dimensional of the block or the circle is ($D_2R_1$)/($D_1R_2$). If the user identifies one of the blocks as a square or one of the circles as a perfect circle (not an ellipse), that block or circle can then used to calculate the display aspect ratio based on the expression ($D_2R_1$)/($D_1R_2$).

To figure out the diagonal size of the display system, in one implementation, the user is asked to input the size (as shown in element 1005 of FIG. 2b) and visually verify that the input is correct, as shown in FIG. 2b. To verify that the user input is correct, for example, a 12.1-inch display size is not mistakenly entered as 12-inch, an image of a well-known 2-dimensional object is shown on the screen displayed in a size that is supposed to be its real size calculated based on the user input. The user is asked to bring a real object and place it on the screen in order to verify that the image is of the same size as the real object. The method of displaying the well-known 2-dimensional object in its real size based on the diagonal size of the display (and the size of a display element $l_1$ and $l_2$) is discussed in Equations (3) and (4).

The well-known object used in the above discussed method can be any object that is of a standard size and easy to find, such as a driver's license card, a passport, dollar bills, etc. In some implementations, the display system can store the size of a driver's license card (e.g., 3⅜"×2⅛") as a default value.

In determining the size of the display element in a display system, one approach may be to ask an online viewer to place a well-known 2-dimensional object on the display and mark the area the real object occupies on the display. For example, as shown in FIG. 2b, a viewer places a standard driver's license card (element 1004 in FIG. 2b) and uses the mouse or keyboard to mark the area the element 1004 occupies on the display.

To help the viewer mark the area the object occupies on the display, in one implementation, the viewer is asked to place the object at the bottom of the display and to use the display frame to support the object, as shown in FIG. 2b. In this way, the viewer does not need to hold the object while marking the area. Assume that the 2-dimensional object is rectangular. When the object is placed at the bottom of the display and uses the display frame for support, the borders of the object are parallel to the borders of the display system frame. Thus it is sufficient to use just vertical lines and horizontal lines to accurately mark the area that the object occupies on the display. The viewer does not need to mark the bottom of the area the object occupies on the display because the display frame marks the bottom of the area, as shown in element 1008 in FIG. 2b.

Furthermore the viewer is asked to align the left side of the object with a vertical edge of the screen, as shown in the element 1007 in FIG. 2b. In this way the viewer does not need to mark the left side of the area the object occupies on the display.

A dotted line is drawn as element 1006 in FIG. 2b. The dotted line starts from the left-bottom point of the object which is where the element 1007 and the element 1008 join. For a given point 1011 on the dotted line 1006, the number of display elements between the left edge and the point 1011 along the horizontal dimension is $D_{left}$ and the number of display elements between the bottom edge (the element 1008) and the point 1011 is $D_{bottom}$, along the vertical dimension. For a display system with aspect ratio $D_1:D_2$ and resolution $R_1 \times R_2$ and a well-known 2-dimensional object with aspect ratio of $W_{object}:D_{object}$, we have:

$$D_{left} : D_{bottom} = \frac{W_{object} \cdot D_2 \cdot R_1}{D_{object} \cdot D_1 \cdot R_2}. \quad (2)$$

When the viewer clicks on any point on the dotted line 1006, the user marks at the same time both the top side and the right side of the area that the object occupies on the display.

When the viewer clicks on a point 1010 in the area 1002 in FIG. 2b, which is the area between the left border (line 1007) and the dotted line 1006, a dotted horizontal line is drawn at the point 1010. The dotted horizontal line intersects with the dotted line 1006 at the point 1011. The point 1011 can be used to mark both the top side and the right side of the area that the object occupies on the display at the same time because for the point 1011, the ratio of the distance to the line 1007 and the distance to the line 1008 equals to the aspect ratio of the object $W_{object}:D_{object}$.

When the viewer clicks on the point 1009 in the area 1003 in FIG. 2b, which is the area between the bottom border 1008 and the virtual line 1006, a dotted vertical line is drawn at the point 1009. The dotted vertical line intersects with the dotted line 1006 at the point 1012. The point 1012 may be used to mark both the top side and the right side of the area at the same time that the object occupies on the display for the same reason as stated for the point 1011.

Therefore, the viewer is able to mark the area occupies by the object on the display with one simple click on a mouse.

For a well-known 2-dimensional object with W-inch in width and H-inch in height, it spans an area of $S_1 \times S_2$ display elements on the display, we can calculate the side 214 ($l_1$) and the side 212 ($l_2$) of a display element (see FIG. 2a) using the following equation:

$$l_1 = W/S_1, l_2 = H/S_2 \qquad (3).$$

The customer's screen resolution may be stored in his online browser software or hardware. The next time when the customer wants to view pictures with WYSIWYG effects, the current screen resolution is compared with the previous resolution stored in the browser. If the resolution has been changed, or the browser has been moved among screens attached to one display system but with different resolutions, the current display resolution will not be the same as the stored value. The computer application implemented based on the present invention needs to re-calculate the size of each display element, either automatically or based on user input.

If the width and height of the display are switched, the screen is considered to have been rotated. Thus the application simply switches the width and height of each display element.

If the width and height are different from the stored values and are not switched, the method described above can be used to recalculate the size of each display element.

When an online customer zooms in or zooms out on the browser, the size of each display element is adjusted accordingly. During zooming, the size of a webpage is changed by a ratio (r), to preserve the WYSIWYG effect regardless of the zooming level, the size of each display element becomes:

$$l_1 = l_1/r, l_2 = l_2/r \qquad (4).$$

Having derived the lengths of the sides 212 and 214 of a display element ($l_1$ and $l_2$), we can use them to render an image on a display system with desired WYSIWYG effects.

To simplify our discussion, we will use a 2-dimensional object as an example to illustrate the techniques, and assume that the each display element is a square with length $l = l_1 = l_2$. How to apply the techniques to an image of a 3-dimensional object will be discussed later. The same techniques and methods can be used on a display system with rectangular display elements ($l_1 \neq l_2$).

Figure 3:
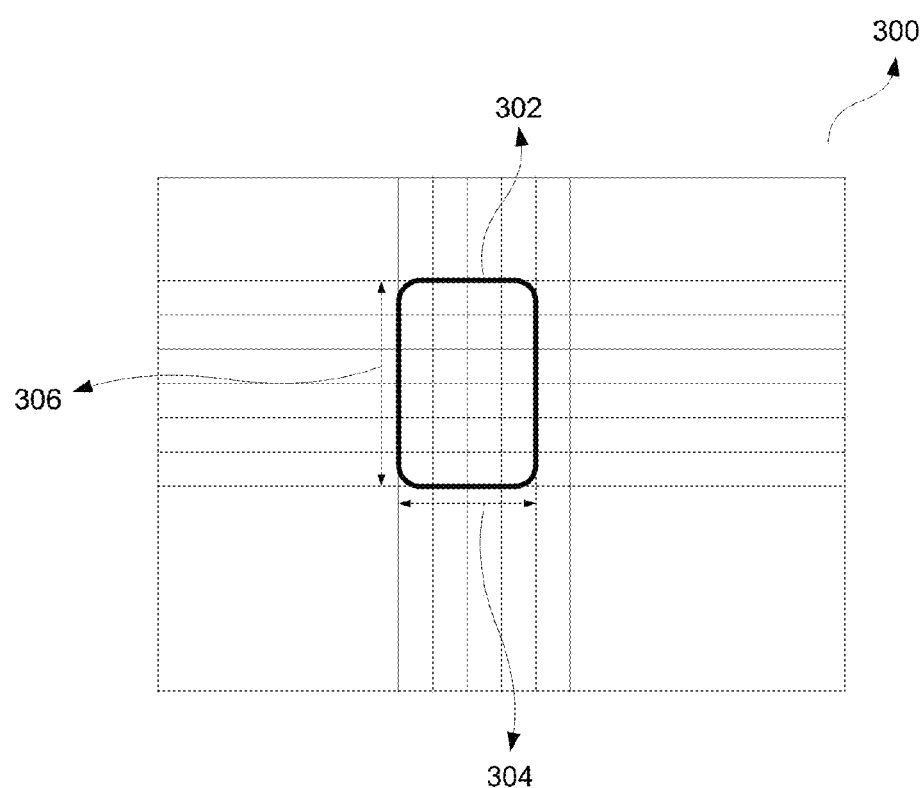
FIG. 3 is a display system displaying an iPhone.
Figure 4A:
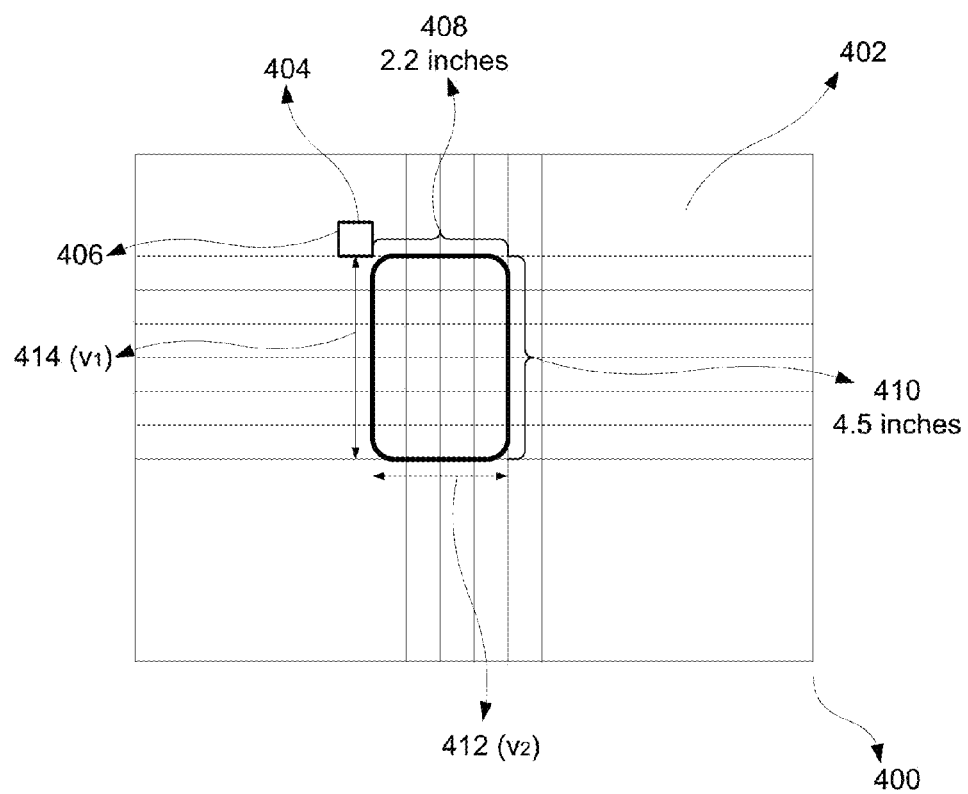
FIG. 4*a* is a display system displaying an object in its reality view when its dimensions are known.

In FIG. 3, an image of the front side of an iPhone 302 is rendered on a display system 300. The image 302 is of the same size of a real iPhone. That is, the length 306 of the image 302 equals to the length of a real iPhone and the width 304 of the image 302 equals to the width of a real iPhone. FIG. 4a illustrates how this is done when the dimensions of a real iPhone are known before hand.

As shown in FIG. 4a, a display system 400 displays an iPhone image 402. The length 410 and width 408 of a real iPhone are: 2.2" and 4.5". Each display element of the display system 400 is a square and of the same size. The length of the side 404 of the display element is l. The number of display elements 414 occupied by the image of the front side of the iPhone along the vertical dimension can be derived using the following equation:

$$v_1 = \frac{4.5''}{l}. \qquad (5)$$

The number of display elements 412 occupied by the image of the front side of the iPhone along the horizontal dimension is:

$$v_2 = \frac{2.2''}{l}. \qquad (6)$$

$v_1$ and $v_2$ are integers and may be rounded. By plotting an image of an iPhone that spans $v_1$ display elements in the vertical dimension and $v_2$ display elements in the horizontal dimension, the display system 400 can render the image of the front side of an iPhone, the image 402, which looks the same as the front side of a real iPhone.

In today's technology, knowing how many display elements along the horizontal and vertical dimensions is sufficient for displaying a 2-dimensional image either on a LCD screen or a plasma screen or a projector type monitor. In any real-world application of this invention, the images may be far more complicated and the technology may be any of the existing or emerging display technologies, the essence of figuring out where and how to plot each dot boils down to figuring out the distances between two dots or between each dot and a reference point. The distances are often expressed in a number of display elements. The above illustrated examples on how to derive the sides of a rectangle expressed in numbers of display elements can be readily applied to complex examples.

Figure 4B:
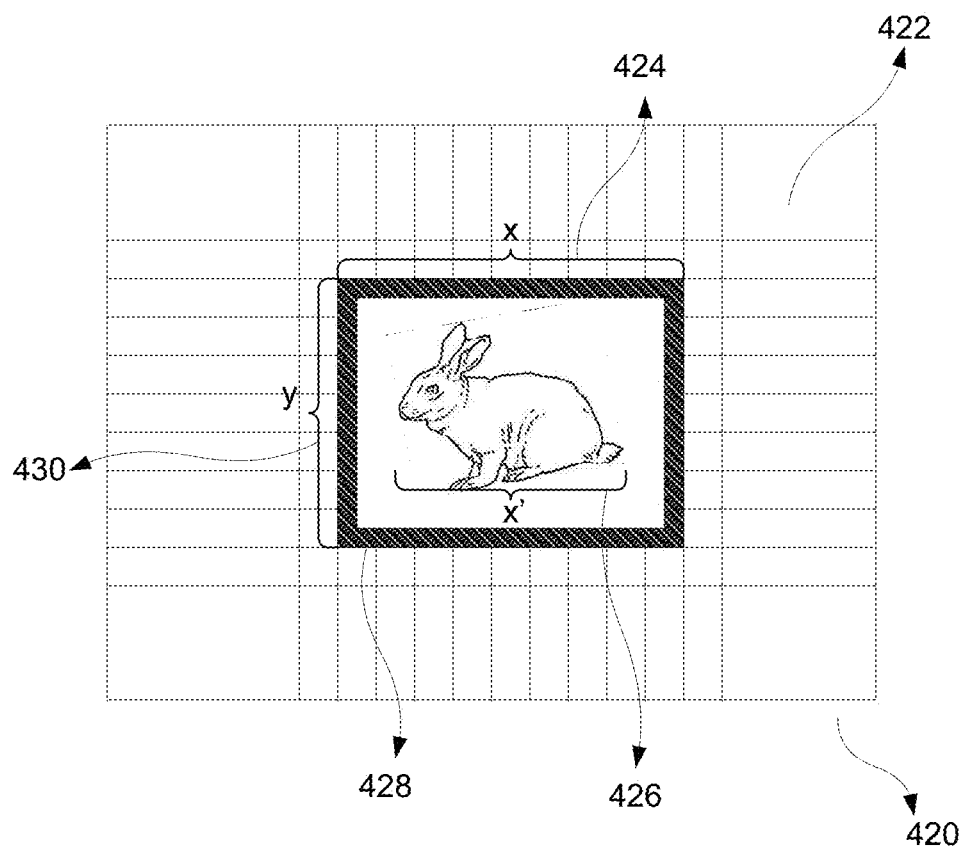
FIG. 4*b* is a display system showing a picture of an object in its reality view when the object's dimensions are known.

In the above discussion, the displayed image is an image of an object itself. Often times, pictures (of an object plus its surroundings or background) are used by a display system for displaying. For example, in FIG. 4b, a picture of a 2-dimensional dwarf rabbit painting is presented on a display system 420. The picture has a border 428. Inside the border 428 is an image of a dwarf rabbit. The dwarf rabbit image is of the length x'. The image 422 of the picture has a length 424 ($x$) and a width 430 ($y$).

Suppose a seller of paintings or a website operator would like to generate WYSIWYG effects of the image 422 for his online customers, for example, making the size of the dwarf rabbit painting inside the image 422 match that of the real rabbit painting. The seller of the paintings or the website operator may or may not know the length of the real dwarf rabbit painting beforehand.

If the user knows the length of the real dwarf rabbit painting, $L_{rabbit}$, the ratio that the image of the dwarf rabbit needs to be enlarged is:

$$\frac{L_{rabbit}}{x'}.$$

Therefore the length of the entire picture 422 needs to be enlarged to:

$$x \times \frac{L_{rabbit}}{x'}.$$

That means, on the display system, along the horizontal dimension, the number of displaying elements occupied by the picture is:

$$\frac{x \times \frac{L_{rabbit}}{x'}}{l}.$$

Here l is the length of a side of a square display element in the display system 420, assuming each display element is of the same size.

Similarly, the number of displaying elements occupied by the picture along the vertical dimension can be derived if the height of the real rabbit painting is known before hand.

Often the user does not know the length or the width of the real rabbit painting. However the length and the height of the real rabbit painting can be derived from the configuration of the camera that was used to take the picture of the rabbit painting. The mathematics employed in the derivation is described below.

Figure 4C:
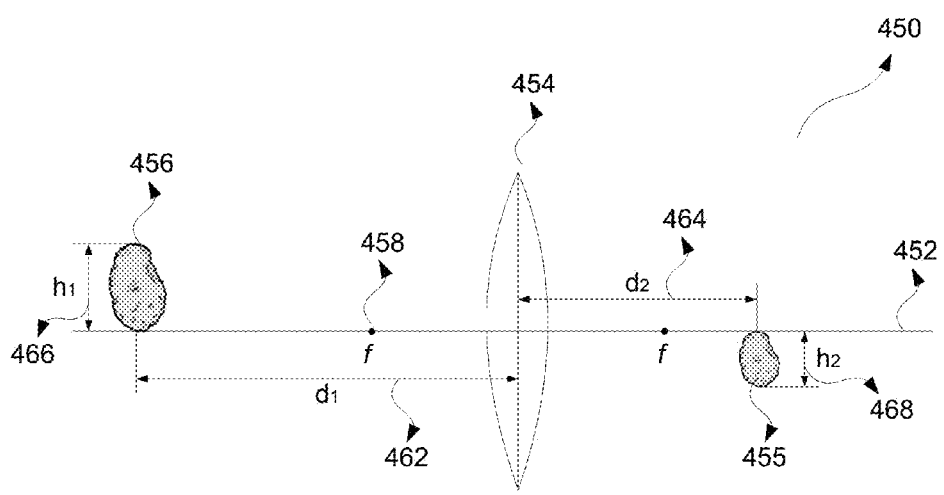
FIG. 4*c* illustrates a camera configuration.

In FIG. 4*c*, a simplified camera model 450 is shown. Inside the model 450, a lens 454 is placed vertical to the axis 452. The lens 454 has a focal length f and two focal points 458 and 460 are marked on each side of the lens 454. An object 456 is placed at a distance 462 ($d_1$) in front of the lens 454. An image 455 is formed at a distance 464 ($d_2$) behind the lens 454. The height of the object 466 is $h_1$ and the height of the image 455 is $h_2$. The dimension of the object 456 is related to the dimension of the image and the camera configuration as following.

$$\frac{h_1}{h_2} = \frac{d_1}{d_2},$$

wherein $$d_1 \times d_2 = f^2.$$

Therefore, $h_1$ can be expressed in terms of the known parameters, f, $d_1$, and $h_2$ as:

$$h_1 = h_2 \times \frac{d_1^2}{f^2}.$$

Figure 5:
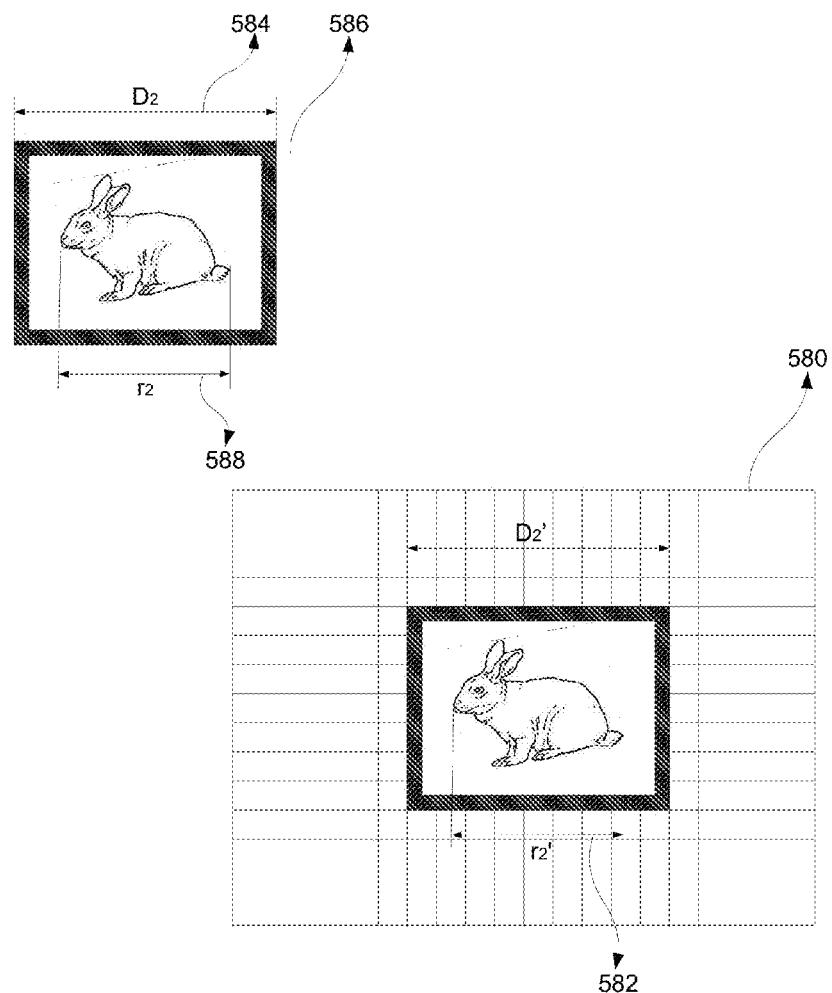
FIG. 5 displays an object in its reality view based on the size of the picture and camera configuration.
Figure 6:
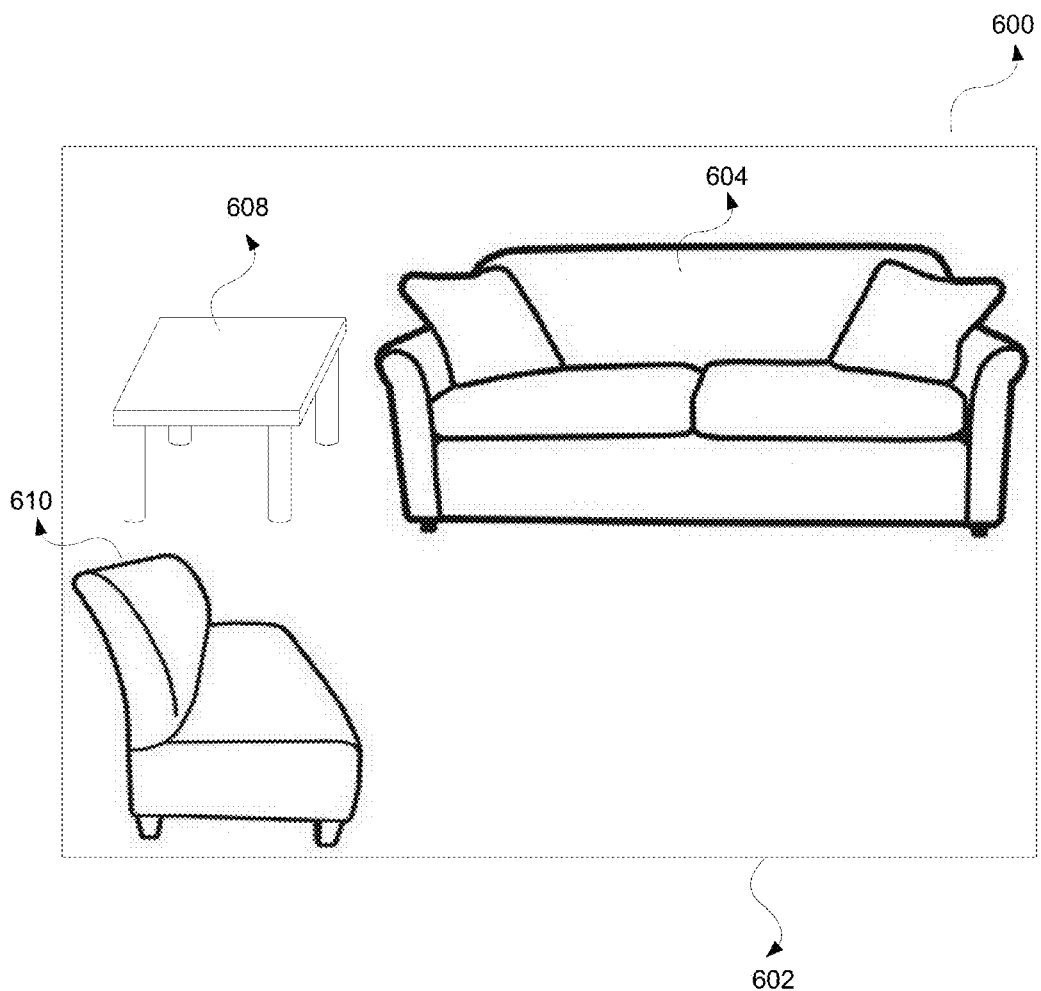
FIG. 6 illustrates fitting an image of a coffee table into a picture of a home environment.

Now referring to FIG. 5, we show how, without the knowledge of the size of the rabbit painting, a picture of the painting may be enlarged to show an image of the painting corresponding in size to the real painting. In FIG. 5, an image based on a photograph 586 is rendered on the display system 580. In the photograph 586, the painting image has a length 588 of $r_2$ and the border of the picture has a length 584 of $D_2$. Based on the camera configuration (the distance d where the real 2-dimensional object or a 2-dimensional feature of a 3-dimensional object is placed and the focal length f of the lens), the length of the life-size painting $r_2'$ can be derived from the length of the image of the painting, $r_2$, using Equation:

$$r_2 \times \frac{d^2}{f^2}.$$

On the display system 580, the length of the rabbit image is the same as the length of the rabbit painting $r_2'$. The length of the border of the picture $D_2'$ needs to be enlarged by a ratio of $$\frac{r_2'}{r_2}.$$

It should be noted that configurations of real cameras may include other physical parameters, such as the curvature of the lenses, etc., in order to take into consideration the distortions caused by the lenses.

Once the size of a display element is derived from Equations (3) and (4), a user can apply the above described method in adjusting the size of a picture or an image to achieve WYSIWYG effects. One such effect is to make the object in the image the same size as the real object and applications thereof can be found in internet commerce. As mentioned in the background section, merchandise photos displaying WYSIWYG effects may give internet shoppers the kind of experience similar to that of in-store shopping. Seeing the WYSIWYG effects of a digital camera on display with on the computer screen and believing what he sees is what he gets allows the customer to appreciate the compact design. Seeing a side view of a life-size laptop allows a customer appreciate the thinness or the sleekness of the design. This feature of displaying a sales item with WYSIWYG effects may be implemented as an option that can be turned on or off. This feature may be also used by a search engine. When a user searches for a product, the search engine may choose to display images of the product with WYSIWYG effects. This feature may also be used by a museum to display on its website its rare collection items with WYSIWYG effects.

The above described method of adjusting the size of an image or images on a display system may also find application in in-store furniture shopping. Software implementing those methods may prove to be handy for a customer who wants to buy a coffee table for the corner space between her sofa and her chair in her home, as shown in FIG. 1*b*. Instead of measuring the dimensions of the space to be filled, she takes a picture 602 of the corner with the sofa and chair in view and stores her picture on her portable electronic device, e.g., iPhone, PDA, laptop, etc., or onto a web service website. If the picture is uploaded onto a website, it can be downloaded for later use. The customer takes her portable electronic device with her to a furniture store and sees a coffee table she likes. Not sure whether the coffee table will fit in between her sofa and her chair, she takes a picture of the coffee table.

An application installed on the portable electronic device then manipulates the two pictures, one of the corner space and the other of the coffee table, with the former perhaps retrieved from a website. For example, using the above described method of adjusting the size of an image, the application can adjust the sizes of the objects in both pictures to be the same as those of the real-life objects. The application can accomplish this based on the measurements the customer inputs or based on the assumption that the pictures are taken with a fixed configuration, i.e., the same focus distance and the same distance between the object and the lens. The application can also adjust the sizes of the images in some other ways, e.g., trying to fit everything into the screen of the portable electronic device while the ratio of the objects on the display system is the same as the ratio of their real sizes.

After the two pictures are adjusted to reflect a same ratio enlargement or reduction in size, the customer can superimpose the picture of the coffee table onto the picture of the corner space, as shown in FIG. 5, to see whether the coffee table fits into the corner space not only geometrically but also aesthetically, such as in matching color scheme or complimentary fashion style.

In some implementations, a picture can be superimposed onto a live camera feed. For example, a customer already has a TV stand at home. He takes picture(s) of his TV stand and measures its size. Then the customer goes to a store and finds a TV he wants to purchase. The customer tells his iPhone, literally or figuratively, about the model of the TV. For example, he can use an iPhone application to scan the TV product bar code or simply type in or speak, then the iPhone application will retrieve an existing image of the TV model. There is another method in which the customer does not need to input the TV model. The customer opens the iPhone camera, points his iPhone at the TV and captures the image of the TV on the iPhone screen. The iPhone then pulls out the customer's TV stand picture taken at home which is either stored locally on the iPhone or remotely on a website, and superimposes the TV stand image onto the TV stand image. The TV stand image is adjusted to make the TV stand appear to be there in the store. By adjusting the position of the TV stand on his iPhone screen, the customer can position it beneath the TV. Now the customer is able to see how well the TV he wants to purchase fits in his home without bringing home the TV.

In another example, a user uses her iPhone camera to record an event. While the camera is rolling, the user imposes a static image onto the live recording. The image may be enlarged or reduced as desired and the live recording may be adjusted in size accordingly.

Allowing customers to apprehend the true size of a sales item is one of the innovative ways that can be utilized to enhance online shoppers' shopping experience and let them enjoy the kind of in-store shopping experience in the comfort of their homes. Allowing customers to appreciate the 3-dimensional features of a sales item can also improve an online shopper's shopping experience.

For example, one method that can be used to present a 3-dimensional view of a piece of merchandise, e.g., a vehicle, is by taking photos of the vehicle from different angles. The photos are then flashed on a display system in a sequential manner to present a rotating vehicle.

Another method that can be utilized to allow customers to appreciate the 3-dimensional features of a sales item is by adjusting the 3-dimensional features of a photo of a sales item to make it appear more realistic.

In the above sections when we discuss adjusting the size of an image to make the 2-dimensional or 3-dimensional object in the image appear the same or approximately the same as the real object, we focus on 2-dimensional images, for example, the front side of an iPhone as shown in FIG. 4a. However, some pictures of a real object may contain 3-dimensional features of that object or 3-dimensional features of the environment where the object is situated, for example, the thickness of the iPhone or the surrounding wall. When an image of an object is adjusted on a display system to make the object appear with WYSIWYG effects, the 3-dimensional features present in the image also need to be adjusted to make the entire image appear realistic. An elaborate method based on Equations (7) and (8) can be applied to reconstruct every 3-dimensional feature contained in the image when that image is adjusted to reflect a size of the object that is or is close to its true size.

FIG. 1e explains how Equations (7) and (8) are derived. In FIG. 1e, a disappearing railway 170 is made of two converging steel rails, 172 and 182, and sleepers, e.g., 174, 176 and 178, waning in size.

In FIG. 1e, the lengths of the sleepers, 174, 176 and 178 are expressed as $S_1$, $S_2$, and $S_3$. The distance between two adjacent sleepers is d, assuming the sleepers are evenly spaced. The distance between the location of a view and the sleeper 174 is D (not shown). Based on the mathematics of Perspective Geometry, the relationship between the lengths of the sleepers can be expressed approximately as:

$$\frac{S_1}{S_2} = \frac{D+d}{D}, \tag{7}$$

and $$\frac{S_2}{S_3} = \frac{D+2d}{D+d}. \tag{8}$$

In referring to FIG. 1e, when the length $S_1$ of the sleeper 174 is set, the rest of the pictures, such as the sleepers 176 and 178 can be drawn in appropriate proportions in relation to the sleeper 174 based on Equation (7) and (8). The length $S_1$ of the sleeper 174 can be set to the true length of the sleeper if it is desired. But it can also be set differently as may be required by different applications.

Figure 7:
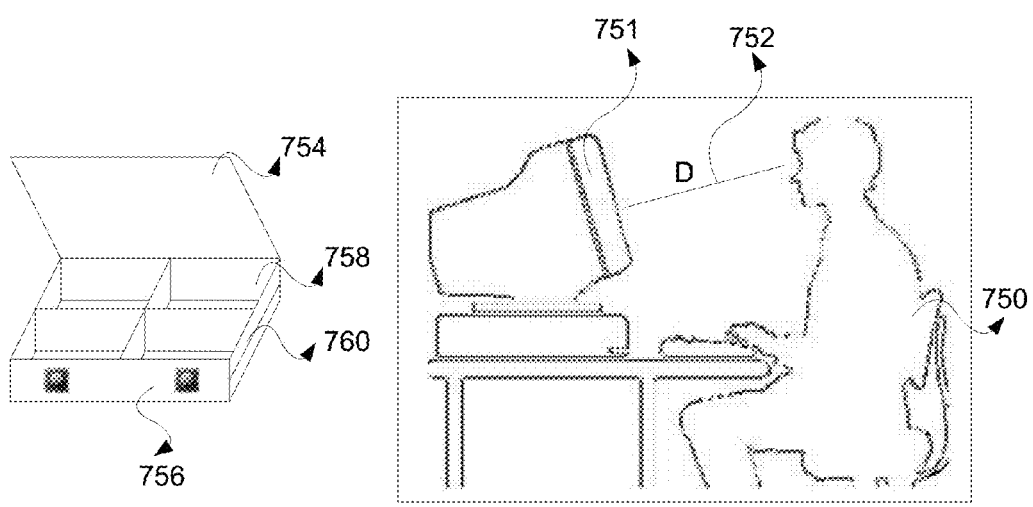
FIG. 7 illustrates how to adjust the 3-dimensional features of an image based on the distance between the display system and the viewer.

As shown in FIG. 7, a computer user 750 is engaged in online shopping. A photo of a sales item, for instance, a jewelry box 754, is on display. The image has been processed to make the front side of the jewelry box 756 in the image the same size of the real object. The rest of the image, including the 3-dimensional features of the jewelry box 754, such as the partitioned interior 758, the elaborate decoration 760 on the side, should be adjusted accordingly to make the entire image appear realistic to the computer user 750.

Based on the assumption that the distance 752 between the computer user 750 and the display system 751, e.g., a computer screen, is D, the enlargement or the reduction of the features in the rest of the image may be carried out according to Equation (7) or (8), either feature by feature or point by point. In Equation (7), d represents the distance between the feature or point to be processed and the front side of the jewelry box.

In some implementations, the distance D between the computer user 750 and the display system 751 may be determined in real-time. A camera or a distance sensor may be used to determine how far a computer user is away from the display system. When the computer user moves closer to or away from the display system, the change of the distance D is monitored and fed to the display system to be used for image re-adjustment. In other implementations, approximation may be used to reduce computation time and increase efficiency. For example, the distance D may be assumed to be constant and take a value that reflects the computer using habit of an average computer user. Or the distance D may be assumed to be zero for simplicity.

As described above, to display images of an object on a display system for WYSIWYG effects, the method of making the object in the image the same size as the real object or approximately the same size as the real object may be employed. When the image is adjusted to make the object in the image the same size as the real object, the perspective 3-dimensional features included in the image should be adjusted accordingly based on how far the viewer is positioned. Perspective 3-dimensional features can enhance real-life effects of any picture. When a picture lacks any or some of the 3-dimensional features, pose estimation techniques can be used to generate 3-dimensional features for the picture to create real-life effects. For example, a picture of an object taken by just one camera often lacks 3-dimensional effects. Pose estimation techniques can be used to re-construct a 3-dimensional model and size measurement information of that object in order to generate another picture of the object with realistic 3-dimensional effect.

Figure 8A:
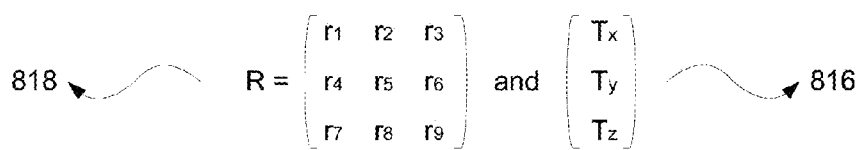
FIG. 8a illustrates how object coordinates can be transformed into image coordinates using rotation and translation matrices.
Figure 8A:
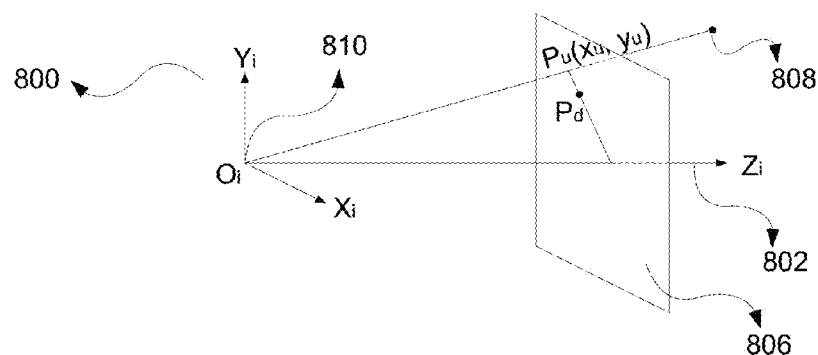
Figure 8B:
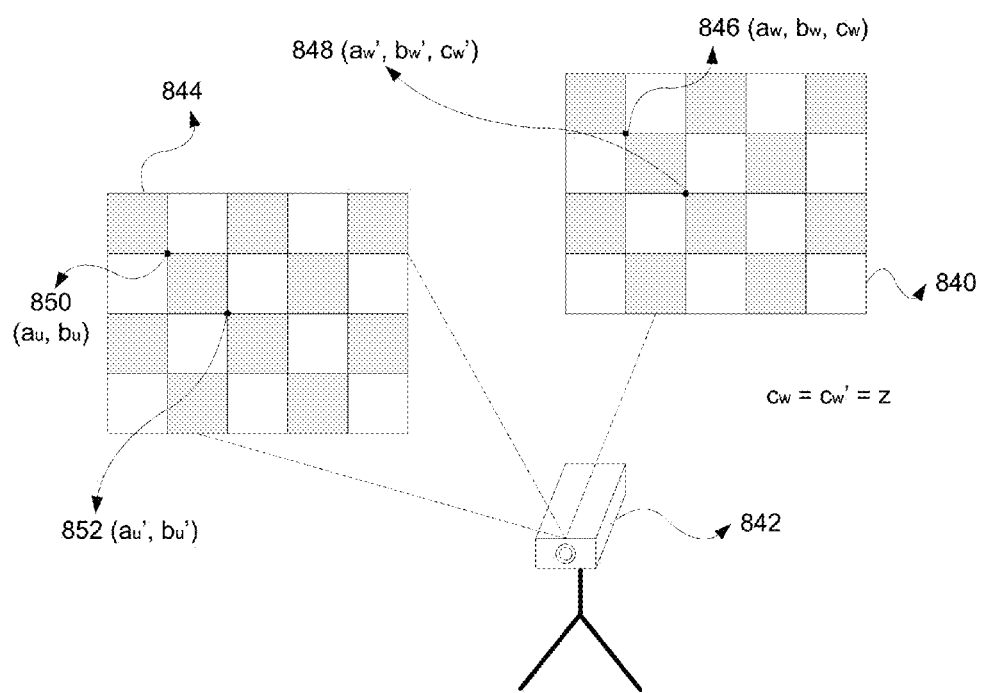
FIG. 8b illustrates deriving rotation and translation matrices using a reference object.

FIGS. 8a-8b explain how pose-estimation can be used to generate 3-dimensional features. In pose-estimation, a reference object is used to calibrate the camera. The reference object and the target are posed together in one picture.

In FIG. 8a, translation matrix T 816 and rotation matrix R 818 are two extrinsic parameters that describe how the camera transforms an object from a real object into an image. For illustration purpose only, the process is explained using one reference point $O_w$. $O_w$ is a reference point in the real world and is transformed by the camera lens system into a point $O_i$ which is then imaged onto the image plane 806. From $O_w$ to $O_i$, the transformation can be expressed as:

$$\begin{pmatrix} x_i \\ y_i \\ z_i \end{pmatrix} = R \times \begin{pmatrix} x_w \\ y_w \\ z_w \end{pmatrix} + T, \quad (9)$$

where $$\begin{pmatrix} x_i \\ y_i \\ z_i \end{pmatrix}$$

is the 3-dimensional coordinates of $O_i$ and $$\begin{pmatrix} x_w \\ y_w \\ z_w \end{pmatrix}$$

is the 3-dimensional coordinates of $O_w$. Translation matrix T 816 can be expressed as:

$$\begin{pmatrix} T_x \\ T_y \\ T_z \end{pmatrix}.$$

with $(T_x, T_y, T_z)$ standing for the 3-dimensional translation from $O_w$ to $O_i$.

And rotation matrix R 818 can be expressed as:

$$\begin{pmatrix} \cos(R_y)\cos(R_z) & \cos(R_z)\sin(R_x)\sin(R_y) - \cos(R_x)\sin(R_z) & \sin(R_x)\sin(R_y) + \cos(R_x)\cos(R_z)\sin(R_y) \\ \cos(R_y)\sin(R_z) & \sin(R_x)\sin(R_y)\sin(R_z) + \cos(R_x)\cos(R_z) & \cos(R_x)\sin(R_y)\sin(R_z) - \cos(R_z)\sin(R_x) \\ -\sin(R_y) & \cos(R_y)\sin(R_z) & \cos(R_x)\cos(R_y) \end{pmatrix},$$

with $(R_x, R_y, R_z)$ standing for the Euler angles of the rotation from $O_w$ to $O_i$.

In FIG. 8a, point $O_i$ is projected onto the image plane 806 as point $P_u(x_u, y_u)$ with $x_u$ and $y_u$ being $P_u$'s coordinates on the image plane 806. If taking into consideration of the distortions caused by the camera, the image point of $O_i$ may be formed at $P_d$, which is slightly displaced from $P_u$. We assume no distortion in the following discussion.

$(x_u, y_u)$ is related to $(x_i, y_i, z_i)$ as following.

$$x_u = f \frac{x_i}{z_i}; \quad (10)$$

$$y_u = f \frac{y_i}{z_i}, \quad (11)$$

with f being the focal length of the lens system of the camera. If $(d_x, d_y)$ represents the distance between adjacent sensor elements, then the coordinates of the image point $O_i$ can be expressed in terms of sensor elements $(x_f, y_f)$ as:

$$x_f = \frac{x_u}{d_x}; \quad (12)$$

$$y_f = \frac{y_u}{d_y}; \quad (13)$$

with the assumption that there is no lens distortion and hardware imperfection.

Based upon the mathematical relations described above, a calibration procedure can be used to construct rotation matrix R and translation T. FIG. 8(b) illustrates an example of such a calibration procedure.

In FIG. 8(b), a checker board 840 is used as a reference object. The checker board 840 is placed in front of the camera. Two points on the checker board are selected for the calibration process. The coordinates of the point 846 are $(a_w, b_w, c_w)$ and those of the point 848 are $(a_w', b_w', c_w')$. Because the checker board 840 is placed parallel to the image plane (not shown), we have $c_w = c_w' = z$. The image 844 of the checker board 840 is formed inside the camera 842 and is enlarged on the left for illustration purposes. The point 846 is imaged into a point 850 with coordinates $(a_u, b_u)$ and the point 848 into a point 852 with coordinates $(a_u', b_u')$.

Using Equations (10) and (11), we get $$a_i = \frac{a_u \times c_i}{f}, \quad b_i = \frac{b_u \times c_i}{f}$$

and $$a_i' = \frac{a_u' \times c_i'}{f}, \quad b_i' = \frac{b_u' \times c_i'}{f}$$

with f representing the focal length of the camera lens and $$c_i' = c_i = \frac{f^2}{z}.$$

From Equation (9), we get:

$$\begin{pmatrix} a_i \\ b_i \\ c_i \end{pmatrix} = R \begin{pmatrix} a_w \\ b_w \\ c_w \end{pmatrix} + T, \text{ and}$$

$$\begin{pmatrix} a_i' \\ b_i' \\ c_i' \end{pmatrix} = R \begin{pmatrix} a_w' \\ b_w' \\ c_w' \end{pmatrix}.$$

Because $(a_u, b_u)$, $(a_u', b_u')$, $(a_w, b_w, c_w)$, $(a_w', b_w', c_w')$, f, and z are known parameters, solving the above two equations yields the rotation matrix R and translation matrix T for the camera. With R and T, pose estimation may be readily carried out as shown in FIG. 8c.

Figure 8C:
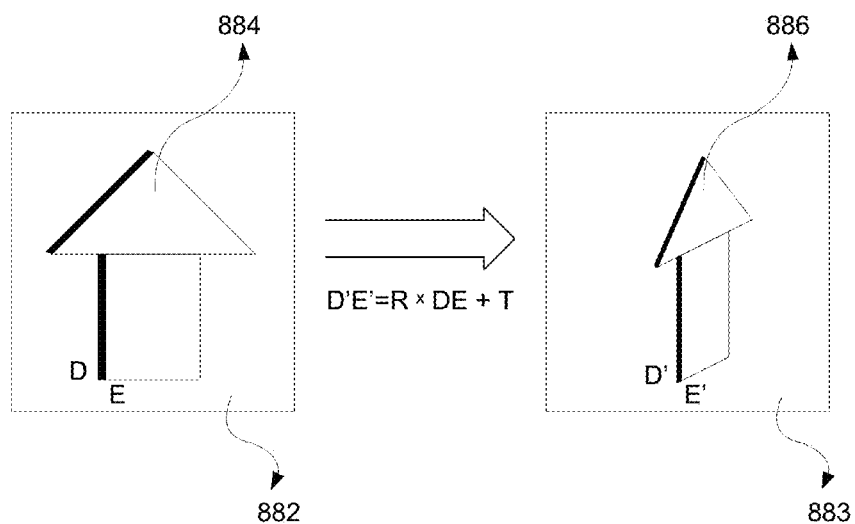
FIG. 8c illustrates using pose estimation to construct 3-dimensional features and size measurement information.

In FIG. 8c, a real object 882 has a front side 884 and side or hind features such as DE. By using just one camera, the front side of the object 882 is captured and presented in the picture 883 as the front side 886. Pose estimation will allow some of the 3-dimensional features of the object 882 that are not captured in the picture 883 to be reconstructed and filled in by an application. For example, line D'E' in picture 886 corresponds to line DE shown in the object 882, with $$D'E' = R \times DE + T.$$

Other 3-dimensional features in the object 882 can be similarly constructed and presented in the picture 883. Instead of using multiple cameras as conventional methods would require, the above described process uses just one camera to construct images and generate measurement information (such as the length of the feature DE) of 3-dimensional objects.

The techniques described herein can be implemented in digital electronic circuitry, or in computer hardware, firmware, software, or in combinations of them. The techniques can be implemented as a computer program product, i.e., a computer program tangibly embodied in a storage medium. A computer program can be written in any form of programming language and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. The computing system can include clients and servers. A client and server are generally remote from each other and typically interact over a communication network. The relationship of client and server arises by virtue of computer programs running on the respective computers and having a client-server relationship to each other.

Method steps of the techniques described herein can be performed by one or more programmable processors executing a computer program to perform functions of the invention by operating on input data and generating output. Method steps can also be performed by, and apparatus of the invention can be implemented as special purpose logic circuitry. Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM; and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims. The above are examples for illustration only and not to limit the alternatives in any way. The techniques described herein can be performed in a different order and still achieve desirable results.

The invention claimed is:

1. A method of displaying a 3-dimensional object contained in an image, a video or a series of images with a "What You See Is What You Get" (WYSIWYG) effect on a display system, said WYSIWYG effect including one or more scenarios, one of the one or more scenarios being displaying the object in a desired size, said display system including one or more display elements, said method including:
    deriving a size of a display element of the display system;
    calculating a number of display elements that the object in the desired size spans for each geometric dimension of the 3-dimensional object based on the size of the display element; and
    generating a 2-dimensional image of the 3-dimensional object substantially in the desired size based on the number of display elements that the object in the desired size spans for each geometric dimension and by uniformly resizing the image, the video, or the series of images comprising the object, wherein the uniformly resizing of the image, the video, or the series of images comprises maintaining a same relative position for every feature in the image, the video, or the series of images in each dimension.

2. The method of claim 1, wherein for each geometric dimension, the size of a display element is derived from dividing a length of the display system by a resolution in that geometric dimension.

3. The method of claim 2, wherein for each geometric dimension, the resolution is stored electronically at a prespecified location and the length of the display system is derived from a length of a diagonal line of the display system and a length-to-width ratio of the display system.

4. The method of claim 2, wherein for each geometric dimension the length of the display system is provided by a user.

5. The method of claim 1, wherein the object is a piece of merchandise for display on the Internet and displaying the piece of merchandise in the desired size allows a user to appreciate a feature in an appearance of the merchandise.

6. The method of claim 5, wherein the piece of merchandise is a digital camera and displaying the digital camera in the desired size allows a user to appreciate the compact design of the digital camera.

7. The method of claim 1, wherein the size of a display element is derived based on user calibration, said user calibration including:
   requesting a user to input a diagonal size of the display system; and
   generating an image of a well-known 2-dimensional object with a WYSIWYG effect based on the diagonal size of the display system;
   requesting the user to place a real item of the well-known 2-dimensional object on top of the image of the well-known 2-dimensional object to confirm that the user input is correct.

8. The method of claim 7, wherein the well-known object is a driver's license card.

9. The method of claim 7, wherein the well-known object is a credit card.

10. The method of claim 7, wherein the well-known object is a compact disc.

11. The method of claim 1, wherein each of the one or more display elements is a square and of the same size.

12. The method of claim 1, wherein each of the one or more display elements is a rectangle and of the same size.

13. A system that displays a 3-dimensional object in a desired size that equals or substantially equals to a real size of the object, including:
   a display system that includes one or more display elements; and
   a processing unit that is configured to, for each geometric dimension:
      derive a size of a display element of the display system;
      calculate a number of display elements that the object in the desired size spans for each geometric dimension; and
      display a 2-dimensional image of the object in the desired size based on the number of display elements calculated for each geometric dimension and by uniformly resizing the image wherein the uniformly resizing of the image, the video, or the series of images comprises maintaining a same relative position for every feature in the image, the video, or the series of images in each dimension.

14. A non-transitory computer-readable medium with instructions that enable a display system to display a 3-dimensional object in a desired size that equals or approximately equals to a real size of the object, said display system including one or more display elements, the displaying of the object in the desired size on said display system including:
   deriving a size of a display element of the display system;
   calculating a number of display elements that the object in the desired size spans for each geometric dimension of the 3-dimensional object;
   generating a 2-dimensional image of the object substantially in the desired size based on the number of display elements calculated for each geometric dimension and by uniformly resizing the image wherein the uniformly resizing of the image, the video, or the series of images comprises maintaining a same relative position for every feature in the image, the video, or the series of images in each dimension; and
   displaying the generated 2-dimensional image of the object substantially in the desired size.

* * * * *